United States Patent [19]
Tanaka et al.

[11] Patent Number: 4,823,275
[45] Date of Patent: Apr. 18, 1989

[54] AREA CUTTING METHOD

[75] Inventors: Kunio Tanaka; Yasushi Onishi, both of Tokyo, Japan

[73] Assignee: Fanuc, Minamitsuru, Japan

[21] Appl. No.: 44,944

[22] PCT Filed: Jul. 17, 1986

[86] PCT No.: PCT/JP86/00369
§ 371 Date: Mar. 16, 1987
§ 102(e) Date: Mar. 16, 1987

[87] PCT Pub. No.: WO87/00650
PCT Pub. Date: Jan. 29, 1987

[30] Foreign Application Priority Data
Jul. 17, 1985 [JP] Japan .................. 60-157928

[51] Int. Cl.$^4$ .............................. G06F 15/46
[52] U.S. Cl. .................................. 364/474
[58] Field of Search ................. 364/167–170, 364/474, 475, 191–193; 318/568

[56] References Cited
U.S. PATENT DOCUMENTS
4,621,959 11/1986 Kishi et al. ............ 364/475
4,706,201 11/1987 Kish ....................... 364/474

Primary Examiner—John R. Lastova
Attorney, Agent, or Firm—Staas & Halsey

[57] ABSTRACT

The present invention relates to an area cutting method for cutting the interior of an area (AR) by moving a tool along a plurality of offset paths successively offset in an inward direction from a closed curve (AR) specifying the area. The area cutting method includes determining whether the area (AR) bounded by the closed curve (OLC) is to be divided, obtaining, if division is necessary, division suitability a division value for all sets of apices, in which any two apices form a set, by using an evaluation function indicative of a preset division suitability or value, dividing the area by a straight line connecting the two apices (P5, P7) of the set having the maximum suitability, executing similar processing for each divided area (PG1, PG2), deciding tool paths on the basis of the final divided areas, and performing area cutting by moving a tool along the tool paths.

3 Claims, 11 Drawing Sheets

AREA CUTTING METHOD

BACKGROUND OF THE INVENTION

1. Field of the Invention

This invention relates to an area cutting method and, more particularly, to an area cutting method for cutting the interior of an area, which is bounded by a closed curve, upon dividing the area into a plurality of areas.

2. Description of the Related Art

Figure 10A:
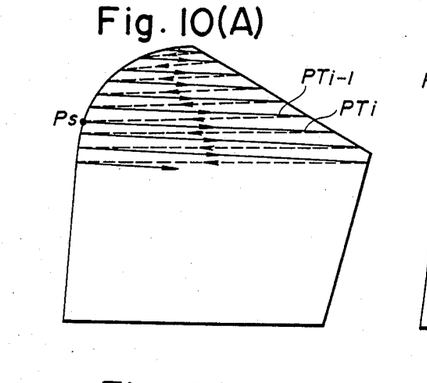

Forms of numerically controlled machining include cutting in which the interior of an area bounded by a closed curve is hollowed out down to a predetermined depth, and die milling in which the interior of an area is die milled. In such machining, as shown in FIG. 10(A), an area cutting method is conventionally carried out by performing cutting along an (i−1)th cutting path PTi−1 in one direction (the direction of the solid line arrow), raising the tool a predetermined amount at the completion of cutting, then positioning the tool directly above a cutting starting point Ps on the next, or i-th, cutting path PTi, thereafter lowering the tool to the cutting starting point Ps, moving the tool along the i-th cutting path PTi in the direction of the solid line arrow, and subsequently repeating the above unidirectional cutting.

Figure 10B:
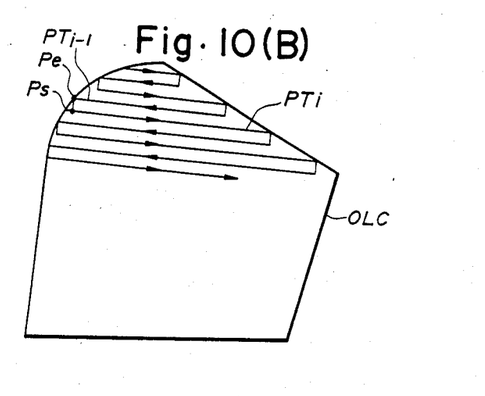

Another area cutting method shown in FIG. 10(B) includes, following completion of cutting along the cutting path PTi−1 of the (i−1)th cutting path, moving the tool from a cutting end point Pe to the cutting starting point Ps on the next, or i-th, cutting path, and thereafter performing cutting along the i-th cutting path PTi. Thus, cutting is performed back and forth in the direction of the arrows.

Figure 10C:
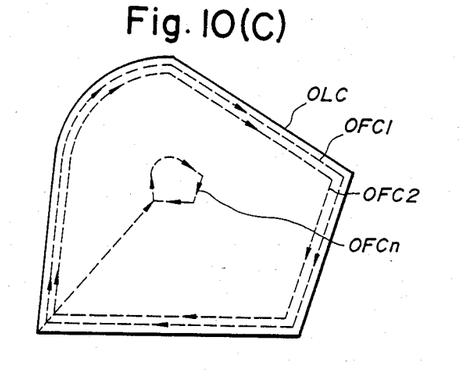

Still another area cutting method shown in FIG. 10(C) includes obtaining offset paths OFC1, OFC2, ... OFCn offset by predetermined amounts with respect to a curve OLC of an external shape, and moving the tool successively along the offset paths.

However, with the first area cutting method based on unidirectional cutting, the tool must be positioned at the cutting starting point Ps on the i-th cutting path PTi after the completion of cutting along the (i−1)th cutting path PTi−1. This method is disadvantageous in that it results in a long tool traveling distance.

Figure 10D:
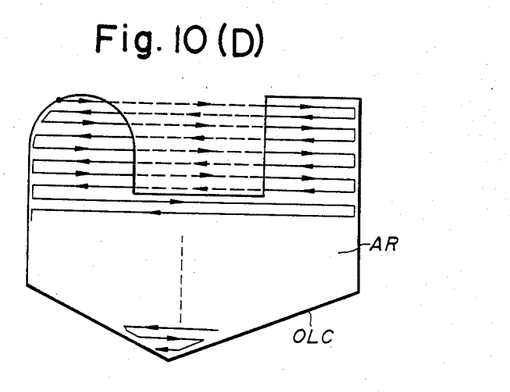
Figure 11A:
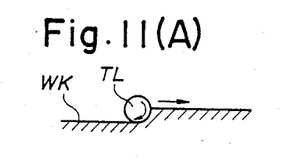
FIGS. 11(A)–11(D) are views for describing up cutting and down cutting processes.
Figure 11B:
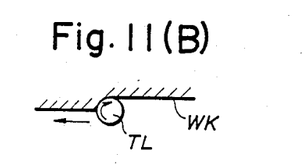
Figures 11C, 11D:
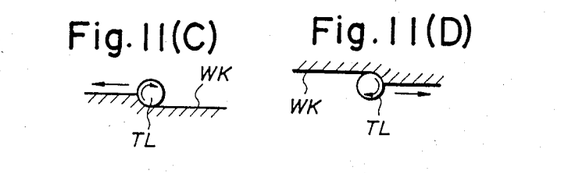

With the second cutting method based on reciprocative cutting, portions are left uncut. In order to cut the uncut portions, the tool must be moved along the external shape curve OLC at completion of the back-and-forth cutting, thereby necessitating both back-and-forth cutting control and cutting control along the shape of the external curve. Accordingly, this method is disadvantageous in that control is complicated. Further, if an area AR has concavities and convexities, as shown in FIG. 10(D), the second method requires movement for achieving positioning indicated by the dashed lines. This is disadvantageous in that tool travelling distance and cutting time are prolonged. In addition, since the cutting process for the outward trip is different from the cutting process for the return trip, cutting cannot be performed efficiently overall. It should be noted that the cutting processes referred to here indicate up cutting and down cutting processes. FIGS. 11(A) and 11(B) show examples of the down cutting process, and FIGS. 11(C), (D) depict examples of the up cutting process. If the workpiece material has been decided, then a cutting method capable of cutting the workpiece efficiently is selected from the up cutting and down cutting processes. However, with the second method, the up cutting process [e.g. FIG. 11(A)] and the down cutting process [e.g. FIG. 11(C)] are always mixed, so that cutting cannot be performed efficiently.

With the third method of cutting along the offset paths, portions are left uncut at, e.g., the central portion of the area, depending upon the contour of the external shape curve. This method is disadvantageous in that dealing with these uncut portions is a complicated task.

Figure 12:
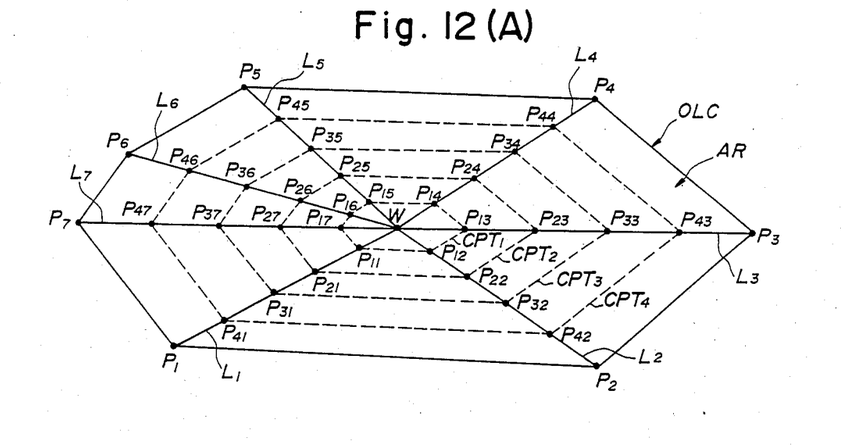
FIGS. 12(A) and 12(B) are views for describing a previously proposed spider web pattern area cutting method.

Accordingly, in order to eliminate the aforementioned drawbacks of the conventional method, the applicant has proposed a method in which a tool path in the form of a spider web pattern is decided within the area and a tool is moved along the tool path to machine area. For example, refer to the U.S. Pat. No. 4,706,201) FIGS. 12(A), (B) are views for describing this area cutting method.

The area cutting method is as follows:

(a) It is determined whether there is a need to divide an area AR bounded by a closed curve OLC.

(b) If division is not necessary [see FIG. 12(A)], line segments L1-L7 connecting the centroid W and apices Pi (i=1, 2, ... 7) are partitioned at a predetermined number of partitions.

(c) Closed curves CPTi successively connecting the corresponding partitioning points Pi1→Pi2→Pi3→Pi5→Pi6 (i=1, 2, ... 4) of the line segments are generated, and area cutting is performed by moving a tool along the generated closed paths.

(d) If division is necessary [see FIG. 12(B)], the area AR is divided into a plurality of areas PG1, PG2.

(e) Centroids W1, W2 of these divided areas are calculated and a number of partitions which will provide the largest cut-in pitch without exceeding an allowable value is obtained for each divided area.

(f) Line segments L11-L15, L21-L24 of the divided areas PG1, PG2 are partitioned at the respective number of partitions.

(g) Closed paths CPAi, CPBj connecting the corresponding partitioning points Qi1→Qi2→... Qi5 (i=1, 2, ...), Rj1→Rj2→... Rj4 (j=1, 2, ...) of the line segments are obtained for the respective divided areas PG1, PG2, and area cutting is performed by moving the tool along each closed path.

The area dividing method is as follows:

(1) The centroid W of the area is obtained.

(2) A check is performed as to whether a line segment connecting the centroid and an i-th (the initial value of i is 1) apex Pi intersects the closed curve OLC.

(3) If the line segment does not intersect the closed curve, the operation i+1→ i is performed and the discrimination processing of step (2) is executed.

(4) If the line segment does intersect the closed curve, a polygon P1P2 ... Pi−1 is made the first divided area PG1.

(5) If the processing of steps (1)–(4) is subsequently repeated for the polygons PiPi+1 ... P1, the area AR will be divided into a plurality of areas. In the example of FIG. 12(B), the area is divided into two areas, namely polygon P1P2P3P4P5 and polygon P5P6P7P1.

However, in accordance with this process for dividing an area in the cutting of an area in a spider web-like pattern, the area is merely divided in such a manner that the line segments connecting the centroid Wi and apices Pi of the divided areas do not intersect the closed curve OLC. Consequently, there are cases where a divided area takes on an elongated, slender shape [see divided area PG2 in FIG. 12(B)]. Tool paths are generated by (a) obtaining the length l of the longest line segment among the line segments connecting the centroid and apices of each divided area, (b) obtaining the largest integer that satisfies the relation $$P \geq l/n$$

using l and a predetermined cut-in pitch P, (c) adopting the integer n as the number of partitions and dividing each line segment into n equal parts, and (d) obtaining, for each divided area, a plurality of tool paths successively connecting the partitioning points of the line segments, and combining these tool paths.

As a result, when an area takes on the elongated, slender shape, a high tool path density occurs at the narrow portions of the area, as is clearly shown in FIG. 12(B). This represents an increase wasted tool movement and diminishes cutting efficiency.

Accordingly, an object of the present invention is to provide an area cutting method through which the occurrence of elongated, slender areas can be minimized when dividing an area.

Another object of the present invention is to provide an area cutting method through which wasted tool movement can be reduced to improve cutting efficiency.

SUMMARY OF THE INVENTION

The present invention provides an area cutting method for cutting the interior of an area by moving a tool along a plurality of offset paths successively offset in an inward direction from a closed curve specifying an area. The area cutting method includes determining whether the area bounded by the closed curve is to be divided, obtaining, if division is necessary, division suitability for all sets of apices, in which any two apices form a set, by using an evaluation function indicative of a preset division suitability, dividing the area by a straight line connecting the two apices of the set having the highest suitability, executing similar processing for each divided area, deciding tool paths on the basis of the final divided areas, and performing area cutting by moving a tool along the tool paths.

BRIEF DESCRIPTION OF THE DRAWINGS

FIG. 3, including 3(A) and 3(B), is a flowchart of processing indicative of the area cutting method of the present invention;

FIGS. 9(A)–10(D) are views for describing the conventional area cutting method;

BEST MODE FOR CARRYING OUT THE INVENTION

Figure 1A:
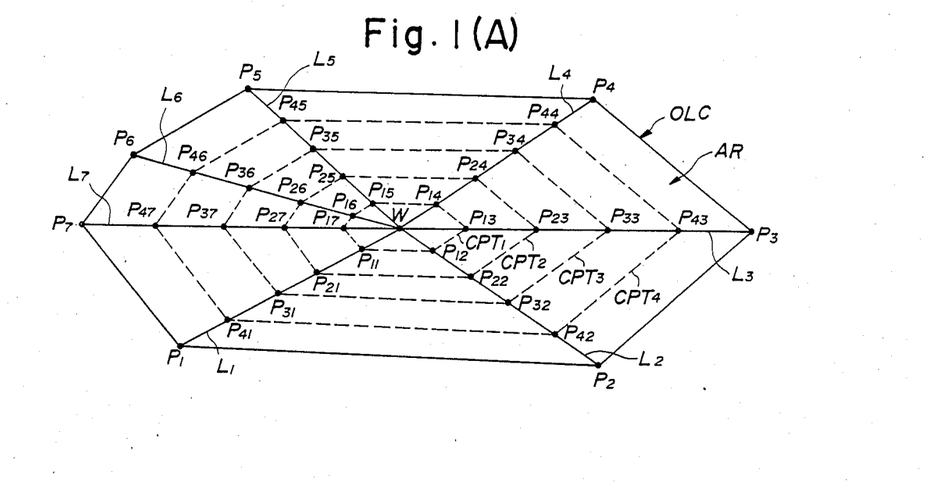
FIGS. 1(A) and (B) are views for describing the general features of an area cutting method according to the present invention.
Figure 1B:
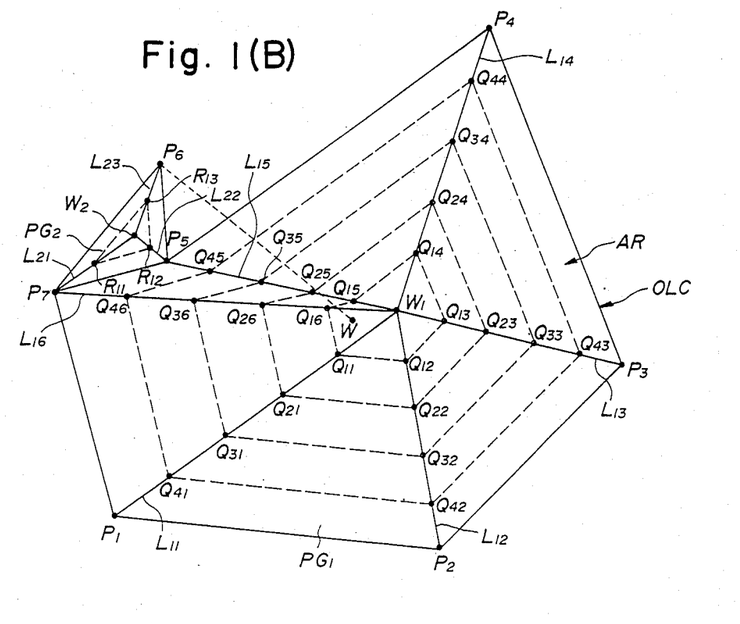

FIGS. 1(A) and 1(B) are views for describing the general features of the present invention, in which FIG. 1(A) is a view for describing a case where division of an area is not necessary and FIG. 1(B) is a view for describing a case where division of an area is necessary.

In these Figures, OLC denotes a closed curve; AR an area bounded by the closed curve; P1–P7 apices of the area; Pij, Qij, Rij partitioning points; L1–L7 line segments; PG1, PG2 divided areas; and W1, W2 centroids of the respective divided areas.

First, it is determined whether the area AR bounded by the closed curve OLC is to be divided. A decision is rendered to the effect that division of the area is necessary when the centroid W of the area AR lies outside the area or when any of the line segments connecting the centroid W with the apices P1–P7 intersects the closed curve OLC if the centroid W lies inside the area.

If it is necessary to divide the area AR [see FIG. 1(B)], division suitability for all sets of apices, in which two apices form a set, are obtained by using an evaluation function indicative of a preset division suitability, and the area AR is divided by a straight line connecting the two apices P5, P7 of the set having the highest suitability.

Thereafter, the foregoing decision regarding the need for division and the division processing using the evaluation function when division is necessary are repeated for each of the divided areas PG1, PG2 until there is no longer need for division.

When the division processing ends, a number of partitions are obtained for each of the divided areas PG1, PG2 in such a manner that the cut-in pitch will be maximized. The line segments L11–L16, L21–L23 connecting the centroids W1, W2 and apices of the respective divided areas are partitioned at the respective number of partitions, tool paths are obtained by taking the partitioning points in the respective divided areas into consideration, and area cutting is performed by moving a tool along the tool paths.

Figure 2:
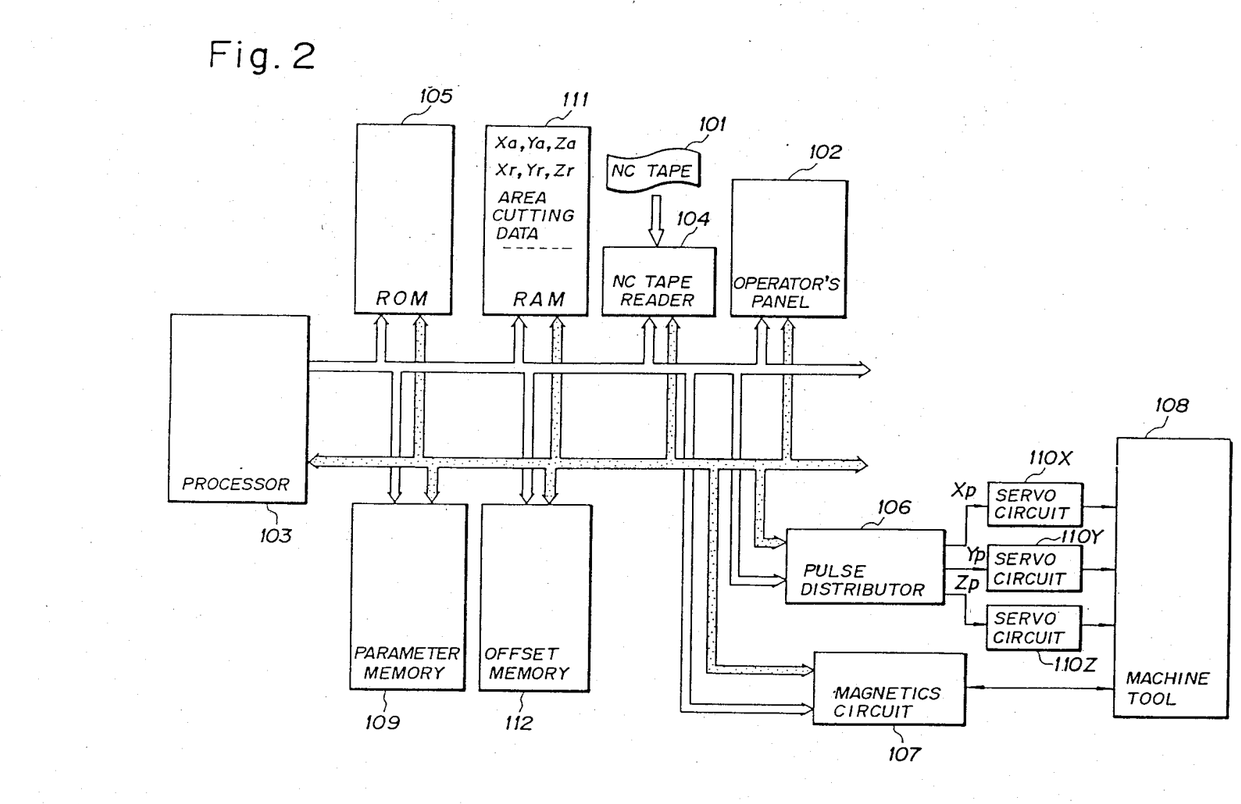
FIG. 2 is a block diagram of an NC system for practicing the present invention.
Figure 3A:
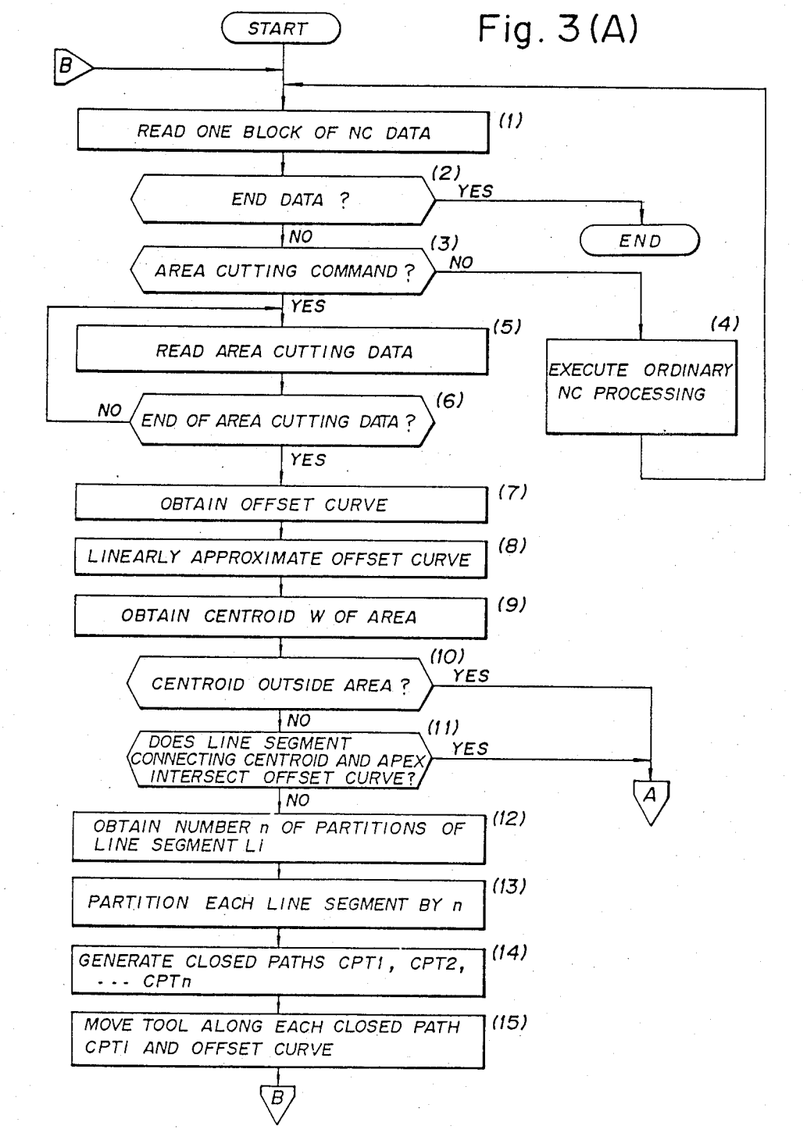
Figure 3B:
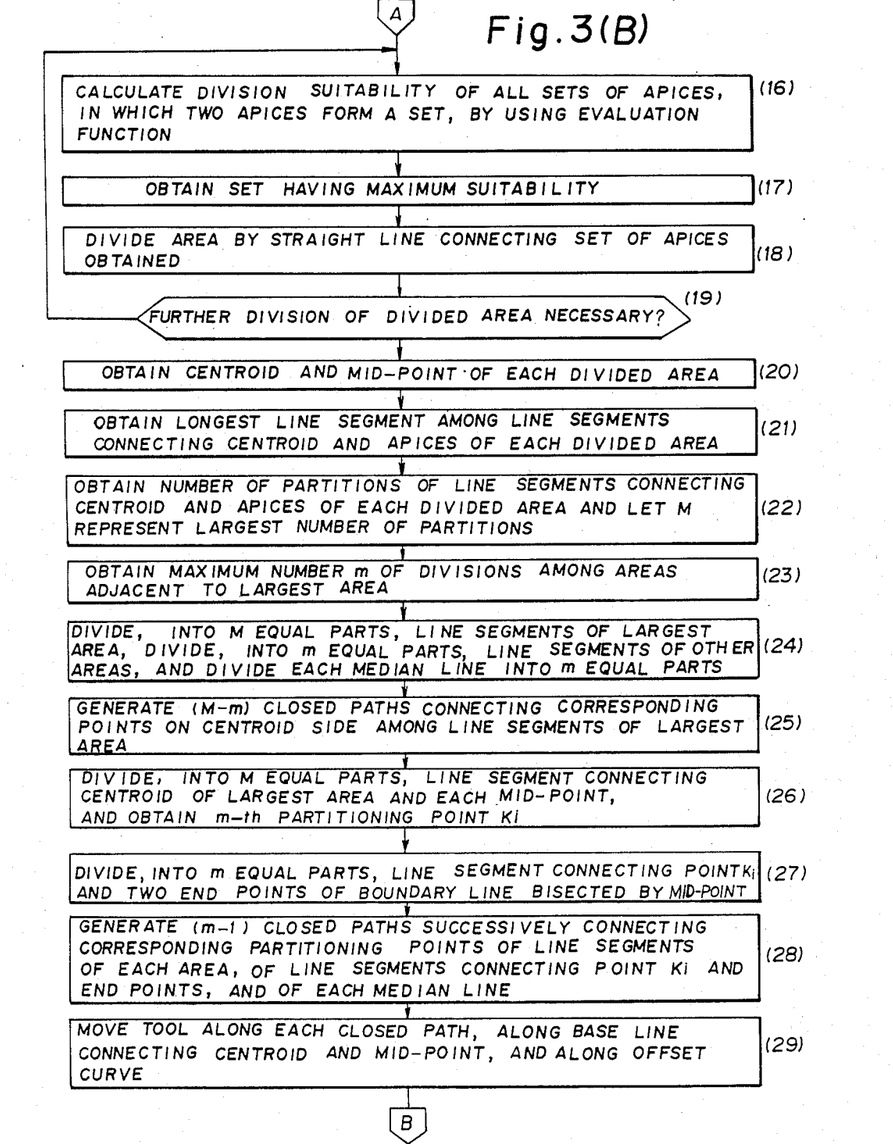

FIG. 2 is a block diagram of an NC system for practicing the area cutting method of the present invention, and FIG. 3 is a flowchart of processing. The area cutting method of the present invention will now be described in conjunction with FIGS. 1 through 3.

Area cutting data necessary for area cutting are recorded at appropriate locations on an NC tape or memory (assumed to be an NC tape hereafter) 101. Specifically, in addition to ordinary numerical control data, area cutting instructions, coordinate values $(x_j, y_j)$ of the apices P1–P7 of the area, the radius rj of a circular arc (no circular arc exists in the piece of FIG. 1), finishing margin t, cut-in pitch P, cutting velocity fc, and data for identifying the end of the area cutting data, are recorded on the NC tape 101. Note that the positions of the apices and the radius of the circular arc are commanded in sets in the e.g. the form $(x_j,y_j,r_j)$, with $r_j=0$ being commanded in the case of straight lines. Accordingly, in the area cutting of the area AR shown in FIG. 1, the area is specified by $Xx_1\ Yy_1\ R0;$ $Xx_2\ Yy_2\ R0;$ $Xx_3\ Yy_3\ R0;$ $Xx_4\ Yy_4\ R0;$ $Xx_5\ Yy_5\ R0;$ $Xx_6\ Yy_6\ R0;$ $Xx_7\ Yy_7\ R0;$ (1) When a cycle start button on an operator's panel 102 is pressed to start the system, a processor 103 causes an NC data reader 104 to read one block of NC data from an NC tape 101.

(2) Next, under the control of a control program stored in a ROM 105, the processor 103 decodes the read NC data and determines whether the NC data are indicative of program end "M02" or tape end "M30". Processing is ended if the data are indicative of program end or tape end.

(3) If the data are indicative of program end, the processor determines whether the NC data are indicative of an area cutting command.

(4) If the NC data are path data and not an area cutting command, then path processing is executed. If an item of NC data is an M-, S- or T- function instruction to be delivered to the machine side, then the instruction is applied to a machine tool 108 through a magnetics circuit 107.

When an item of NC data is path data, the processor 103 finds incremental values $X_i, Y_i, Z_i$ along the respective axes as well as amounts of movement $\Delta X, \Delta Y, \Delta Z$ along the respective axes per unit time $\Delta T$ based on feed rate F. These are inputted to a pulse distributor 106.

On the basis of the input data, the pulse distributor 106 performs a simultaneous three-axis pulse distribution calculation to generate distributed pulses $X_p, Y_p, Z_p$. These are delivered to servo circuits 110X, 110Y, 110Z for the respective axes to transport the tool along the cutting path.

The processor 103, in accordance with the following formulae, updates the present position $X_a, Y_a, Z_a$ every $\Delta T$ sec, $X_a, Y_a, Z_a$ having been stored in a RAM 111:

$$X_a \pm \Delta X \rightarrow X_a \quad (1a)$$

$$Y_a \pm \Delta Y \rightarrow Y_a \quad (1b)$$

$$Z_a \pm \Delta Z \rightarrow Z_a \quad (1c)$$

The sign depends upon the direction of movement. Similarly, in accordance with the following formulae, the processor 103 updates remaining traveling distances $X_r, Y_r, Z_r$ (the initial values of which are the incremental values $X_i, Y_i, Z_i$, respectively) every $\Delta T$ sec, $X_r, Y_r, Z_r$ having been stored in the RAM 111:

$$X_r - \Delta X \rightarrow X_r \quad (2a)$$

$$Y_r - \Delta Y \rightarrow Y_r \quad (2b)$$

$$Z_r - \Delta Z \rightarrow Z_r \quad (2c)$$

When the following condition is established:

$$X_r = Y_r = Z_r = 0 \quad (3)$$

the processor 103 treats this as indicating that the movable element has arrived at a target position and causes the NC data reader 104 to read the next item of NC data.

(5) If an item of NC data read from the NC tape 101 is found to be an area cutting command, the processor 103 causes the NC data reader 104 to read the area cutting data and store the data in the RAM 111 until the code indicating the end of the area cutting data is read out.

(6) Whenever an item of NC data is read, the processor 103 checks the NC data to determine whether it is a code indicative of the end of the area cutting data.

(7) If the NC data is indicative of the end of area cutting data, the processor 103 calculates the curve, which is offset from the closed curve (external shape curve) OLC by a distance D ($=r_a+t$), the latter being obtained by adding the tool radius $r_a$ and the finishing margin t. It should be noted that the tool radius $r_a$ is obtained by reading a radius value corresponding to a commanded tool number from an offset memory 112, which stores the correspondence between tool numbers and tool radii.

Figure 4:
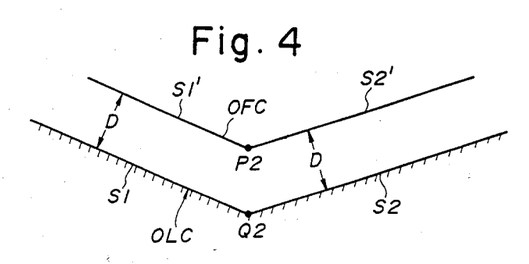
FIG. 4 is a view for describing a method of calculating an offset curve.

The offset curve is found through the following processing. Specifically, as shown in FIG. 4, let two straight lines specifying the curve OLC of the external shape be S1 and S2. Straight lines S1', S2' offset from the straight lines S1, S2, respectively, by the distance D are found. The intersection P2 of the straight lines S1', S2' is then found. The intersection P2 is one point specifying the offset curve. Accordingly, if points of intersection are found in a similar manner and stored in the RAM 111, the offset curve will be obtained. To facilitate the description, the offset curve is not illustrated in FIG. 1. From this point onward, however, the invention will be described considering the closed curve OLC as the offset curve.

(8) The processor 103 now linearly approximates a circular arc portion of the closed curve (offset curve) OFC if the curve has a circular arc portion.

In performing the linear approximation processing, it is so arranged that the maximum distance between the circular arc portion and the straight line takes on a value smaller than the cut-in pitch, which is applied as area cutting data. FIG. 5 is a view for describing the linear approximation processing.

Figure 5A:
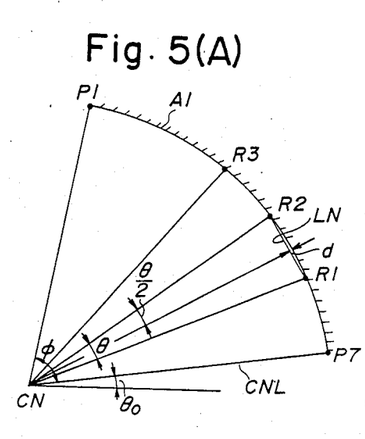
FIGS. 5(A) and (B) are views for describing a method of linear approximation of a circular arc portion.

For a case where the inner side of a circular arc AI is the area to be cut, as shown in FIG. 5(A), the maximum distance d between the circular arc AI and the straight line (chord) LN is given by $$d = r - r \cdot \cos(\theta/2) \quad (4)$$

where the radius of the arc is r and the central angle of the chord LN is $\theta$. Accordingly, the central angle $\theta$ for which $d \leq P$ holds, namely the central angle $\theta$ that satisfies the relation $$\cos(\theta/2) \geq 1 - (P/r) \quad (5)$$

is found, the central angle $\phi$ of the circular arc A1 is partitioned at the angle $\theta$ and the coordinate values of each partitioning point $R_i$ are stored in the RAM 111. This ends the processing for linear approximation of the circular arc portion.

Figure 5B:
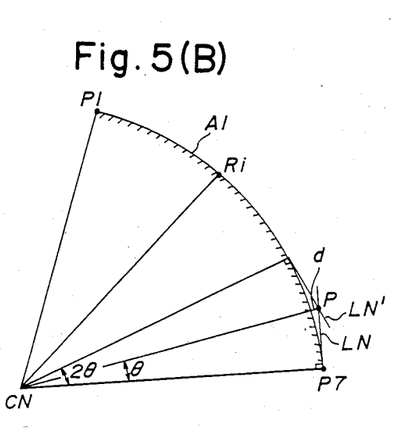

For a case where the outer side of a circular arc A1 is the area to be cut, as shown in FIG. 5(B), the maximum distance d between the circular arc A1 and the straight line LN is given by $$d = (r/\cos \theta) - r \qquad (7)$$

Accordingly, the angle $\theta$ for which $d \leq P$ holds, namely the angle $\theta$ that satisfies the relation $$\cos \theta \geq r/(r+P) \qquad (8)$$

is found, the point $R_i$ linearly approximating the circular arc portion on the basis of $\theta$ is found, and this is stored in the RAM 111. This ends the processing for linear approximation.

(9) When the linear approximation processing ends, the processor 103 obtains the centroid W of the area bounded by an offset curve.

Figure 6:
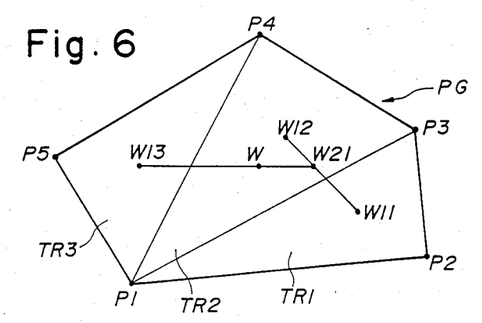
FIG. 6 is a view for describing a method of calculating a centroid.

The centroid W of the region is calculated through processing which will now be described. Assume that the centroid PG shown in FIG. 6 is to be found. The area PG is broken down into a plurality of triangles TR1 through TR3 and the centroids W11 through W13 and areas SQ1 through SQ3 of the respective triangles are calculated. Next, a point W21 that divides a line segment W12W11 connecting the centroids W11, W12 into the ratio SQ1:SQ2 (area ratio) is found. Note that the point W21 is the centroid of a quadrilateral P1P2P3P4. After the point W21 is calculated, a point W is found that divides a line segment W13W21 into the area ratio (SQ1+SQ2):SQ3. The point W is the centroid of the convex polygon PG.

(10) When the centroid W of the area has been found through the foregoing process, it is determined whether the centroid W lies outside the region AR. This is done in the following manner: Taking a clockwise angle as being positive or negative, $$\Sigma \angle P_i W P_{i+1} = a \qquad (9)$$

is evaluated. The centroid is judged to lie
 (i) outside the area when $a = 0$ holds;
 (ii) inside the area when $a = 2\pi$ holds; and
 (iii) on the area boundary line when $0 < a < 2\pi$ holds.

Figure 7A:
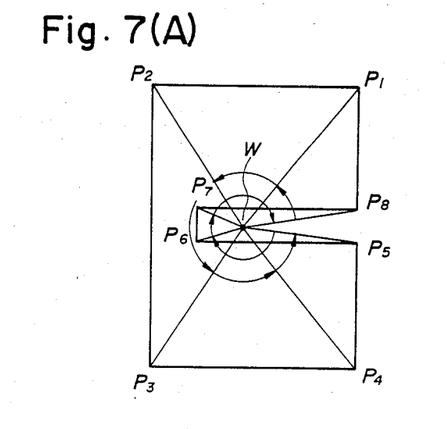
FIG. 7(A) exemplifies the shape of an area for which the centroid lies outside.

FIG. 7(A) illustrates an example in which the centroid W lies outside the area. It will be understood that the sum a of the angles obtained in accordance with the Eq. (9) is zero.

(11) If the centroid W lies inside the area, it is checked whether the line segment Li (i=1, 2, . . . 7) connecting the centroid W with the each apex Pi (i=1, 2, . . . 7) of the area intersects the closed curve OLC. This is done in the following manner: Taking a clockwise angle as being positive or negative, the sign of the angle $\angle P_{i-1}WP_i$ (i=1, 2, . . . n) is checked. If all angles have the same sign, a decision is rendered to the effect that none of the line segments (L1-L7) intersect the closed curve OLC. If a sign differs, then it is decided that at least one of the line segments intersects the closed curve.

Figure 7B:
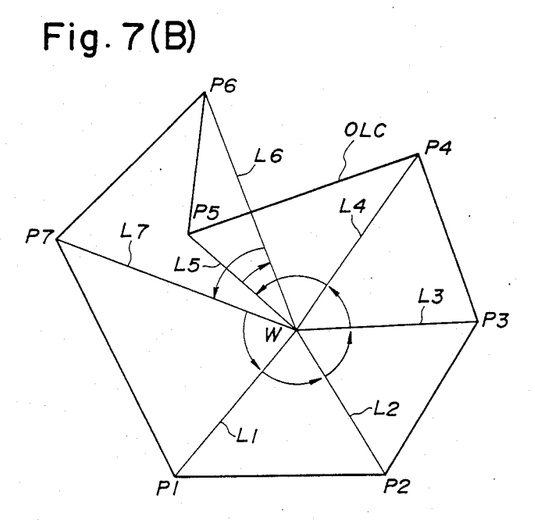
FIG. 7(B) illustrates an example of a shape for which a line segment connecting the centroid and an apex intersects a closed curve.

FIG. 7(B) illustrates an example of the shape of an area in which one line segment intersects the offset curve OLC; only the angle $\angle P5WP6$ is a clockwise angle. The line segment L6 connecting the centroid W and the apex A6 intersects the offset curve OLC.

(12) If none of the line segments L1-L7 intersect the offset curve OLC [see FIG. 1(A)], then the length l of the longest line segment among the line segments L1-L7 is found, the largest integer n that satisfies the relation $$P \geq l/n$$

is found and the integer n is adopted as a number of partitions.

(13) The coordinates of the following partitioning points, which divide the line segments L1-L7 into n parts, are obtained and stored in the RAM 111:

$$P11, P21, \ldots P41;$$

$$P12, P22, \ldots P42;$$

$$P13, P23, \ldots P43;$$

$$\ldots$$

$$P17, P27, \ldots P47;$$

(14) When the coordinate values of the partitioning points of each line segment have been obtained, a plurality of closed paths CPT1, CPT2, . . . CPT4 are generated which connect the following corresponding partitioning points of these line segments:

$$P11, P12, P13 \ldots P17;$$

$$P21, P22, P23 \ldots P27;$$

$$\ldots$$

$$P41, P42, P43 \ldots P47;$$

(15) When the closed paths have been generated, the processor 103 causes the tool to be moved along the generated closed paths and finally along the closed curve (offset curve) OLC, thereby cutting the area AR.

More specifically, by using the coordinate values of the starting point P11 of the first closed path CPT1 stored in the RAM 111, the processor 103 obtains numerical data (incremental values between an initial position and the starting point P11) for making the tool approach the starting point P11 from the initial position, and thereafter executes the aforementioned path processing using the incremental values. When the approach is completed, the processor moves the tool to the point Pa2 along the first closed path CPT1 in a cutting feed mode and thereafter successively moves the tool along the first closed path in the manner P12→P13→. . . →P17→P11 to perform cutting. When the cutting along the first closed path ends, the tool is shifted to the point P21 (P11→P21) in the cutting feed mode and cutting is subsequently performed in a similar manner along the second closed path CPT2, third closed path, . . . and so on. The tool is finally moved along the offset curve in accordance with the data specifying the offset curve stored in the RAM 111. This ends the area cutting processing. Thereafter, the next item of NC data is read from the NC tape and the foregoing processing is repeated.

Although a case has been described where the tool movement sequence is CPT1→CPT2→. . . →CPTn when performing cutting, it is permissible to perform cutting in the sequence CPTn→CPT2→...→CPT1.

(16) If it is found that the centroid lies outside the area or that a line segment connecting the centroid and an apex intersects the closed curve OLC [see FIG. 1(B)], then the area AR is divided into a plurality of areas.

More specifically, taking any two apices of the area as a set, division suitability or division value is calculated for all sets by using an evaluation function. It should be noted that division suitability based on the evaluation function is specified in advance so as to increase with a decrease in the distance between two apices $P_i$, $P_j$, increase with an increase in the angles at the apices $P_i$, $P_j$ on the area side (i.e. the internal angles on the area side), and increase with a decrease in the angle defined by the bisector of each internal angle on the area side and the straight line $P_iP_j$. For example, an evaluation function $F(i,j)$ in which the apices $P_i$, $P_j$ are taken as a set is expressed by the equation $$F(i,j) = F'(i,j) + F'(j,i) \quad (10)$$

Figure 8A:
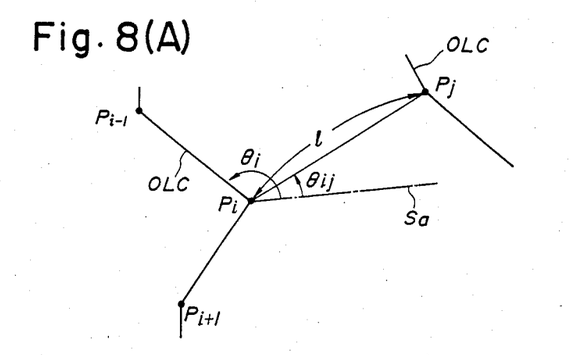
FIGS. 8(A)–8(C) are views for describing the division of an area.

With reference to FIG. 8(A), let l represent the distance between the apices $P_i$, $P_j$, let $\theta_i$ (which is one-half the internal angle on the area side) represent the angle defined by a bisector Sa at the apex $P_i$ and the line segment $P_i - 1P_i$, and let $\theta_{ij}$ represent the angle degined by the bisector Sa and the line segment $P_iP_j$. Then, $F'(i,j)$ will take on the form $$F'(i,j) = \cos[(\pi/2) \cdot (\theta_{ij}/\theta_i)]/l \quad (11)$$

when $\theta_{ij} \leq \theta_i$ holds and the line segment $P_iP_j$ does not intersect the closed curve OLC, and the form $$F'(i,j) = 0$$

when $\theta_{ij} > \theta_i$ holds or the line segment $P_iP_j$ intersects the closed curve OLC.

Figure 8B:
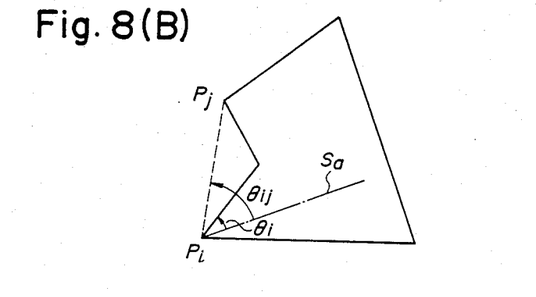

It should be noted that FIG. 8(B) illustrates the case where $\theta_{ij} > \theta_i$ holds.

(17) When the division suitability has been found for all sets in step (16), the set having the maximum division suitability or maximum division value is obtained.

It is also permissible to compare the magnitude of the maximum division suitability obtained thus far with that of a division suitability each time one is found, consider the larger as the maximum division suitability among those found thus far, and successively repeat similar processing thereafter to obtain a set having the maximum division suitability.

Figure 8C:
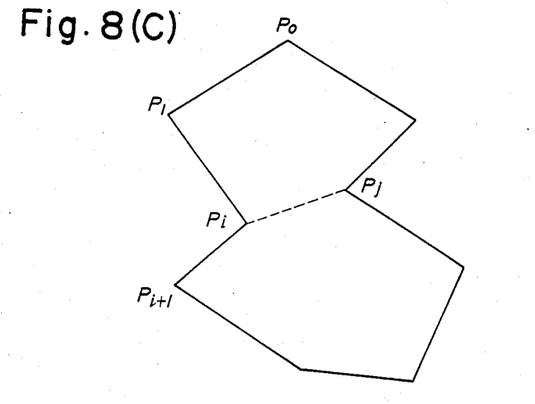

(18) When a set having the maximum division suitability has been obtained, the area AR is divided into two areas by a straight line connecting the two apices $P_i$, $P_j$ of the set. It should be noted that the division suitability based on the foregoing evaluation function is maximum for a case where the constricted portion apices $P_i$, $P_j$ are taken as the set, as shown in FIG. 8(C). The area is divided at the constricted portion. Accordingly, for the case shown in FIG. 8(B), the division suitability is maximum for the set P5, P7, so that the divided areas PG1, PG2 [see FIG. 12(B)] do not take on an elongated, slender shape, as occurs in the prior art.

(19) The processing of steps (10), (11) is subsequently performed for each of the divided areas PG1, PG2 to check whether division is necessary. If division is necessary, then the processing from step (16) onward is repeated.

(20) When the processing for dividing the area ends, the processor 103 generates tool paths based on the areas PG1, PG2.

Tool path generation processing will now be described with reference to FIG. 9.

The centroids W1, W2 of the respective areas PG1, PG2 and the mid-point Mi (=Ml) of the boundary line Bi (i=1) of two mutually adjacent areas. It should be noted that a curve successively connecting the centroids W1, W2 and mid-point Ml is referred to as a base line BSL.

(21) Thereafter, for each of the areas PG1, PG2, the processor 103 finds the line segment having the longest length among the line segments (S11–S16; S21–S24) connecting the respective centroids and apices. In the embodiment of FIG. 9, line segment S16 is the longest for area PG1 and line segment S23 is the longest for area PG2.

(22) Next, the processor finds a number of partitions N1 for which a length of a partitioned line segment obtained by equally partitioning the longest line segment S16 will have a value closest to the cut-in pitch P without exceeding the cut-in pitch P. Similarly, the processor finds a number of partitions N2 with regard to the longest line segment S23. Thus, the processor 103 obtains a number of partitions Ni for each longest line segment (i=1, 2, ...).

Thereafter, the processor 103 obtains the largest number of partitions M and the largest convex polygon. In the embodiment of FIG. 9, M=10 and the largest convex polygon is PG1.

(23) The processor 103 then finds a maximum number m of partitions from among numbers Ni of partitions of areas adjacent the largest area. Since PG2 is the only adjacent area in the embodiment of FIG. 9, the number of partitions of this area is m; hence, m=4.

(24) When m has been found, the line segments S11–S16 connecting the centroid W1 and apices P11–P16 of the largest area PG1 are each divided into M equal parts, the line segments S21–S24 connecting the centroid W2 and apices S21–S24 of the adjacent area PG2 are each divided into m equal parts, and median lines B11, B12 connecting a mid-point Mi (=M1) of a boundary line Bi (=B1) with the two end points P14, P15 of the boundary line are each divided equally by m.

Figure 9A:
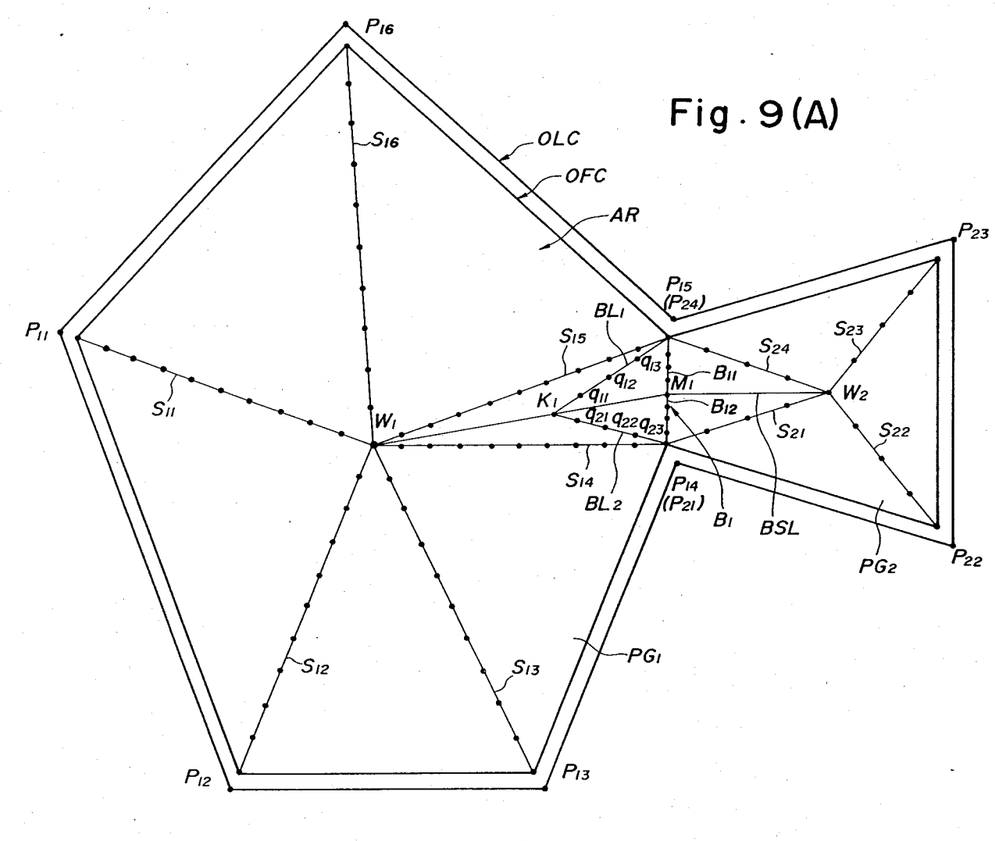
FIGS. 9(A)–9(B) are views for describing an area cutting method for a case where an area is divided into a plurality of areas.
Figure 9B:
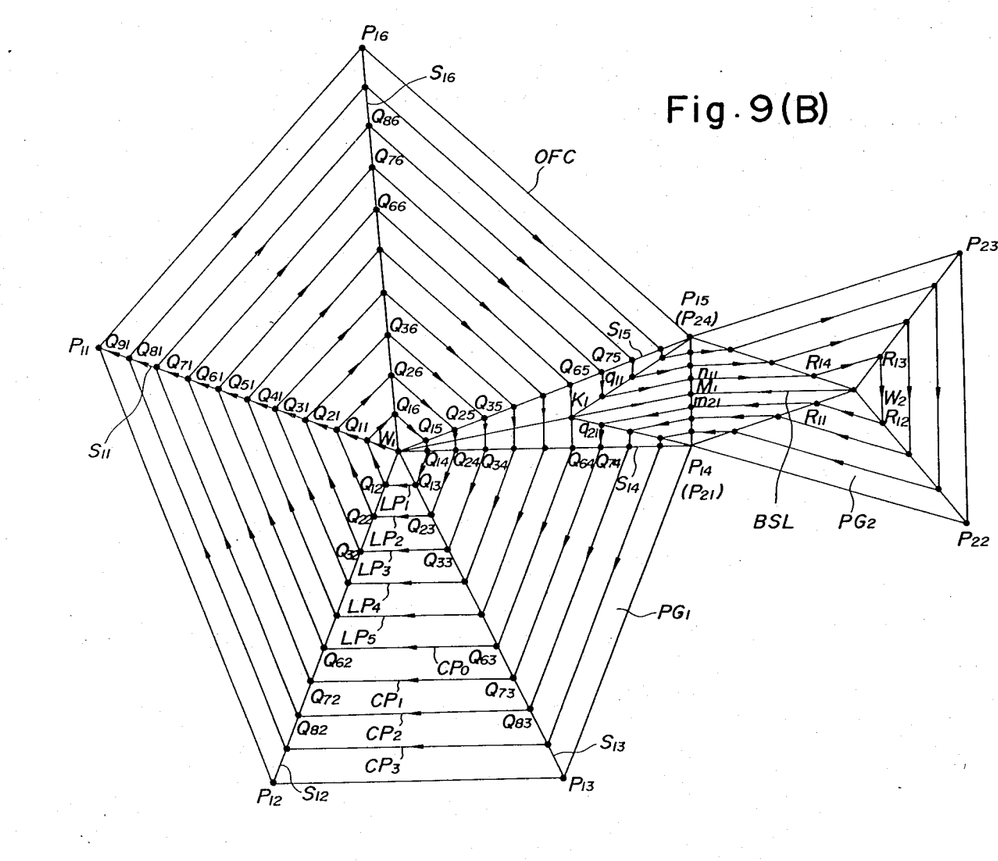

(25) When the partitioning points have been obtained, the processor 103 generates (M-m) closed paths LP1–LP5 [see FIG. 9(B)] successively connecting corresponding partitioning points Qi1→Qi6→Qi5→Qi4→Qi3→Qi2→Qi1 (i=1, 2, ... 5), on the centroid side, of the line segments S11–S16 connecting the centroid W1 and apices P11–P16 of the largest area PG1.

(26) The processor thenceforth divides, into M equal parts, the line segment W1M1 connecting the centroid W1 and mid-point M1 of the largest area PG1, and obtains an m-th partitioning point Ki (=K1) counting from the mid-point side [see FIG. 9(A)].

(27) When the partitioning point K1 has been found, the processor obtains partitioning points q11–q13, q21–q23 which respectively divide, into m equal parts, two line segments BL1, BL2 connecting the point K1 with the two end points P14, P15 of boundary line Bl, which is bisected by the mid-point M1.

(28) Thereafter, the processor 103 generates m closed paths CP1–CP3 successively connecting corresponding partitioning points of line segments Sij (S11–S16, S21–S24) connecting the centroid and apices of each area, of the two line segments BL1, BL2 connecting the point Ki (Kl) and points P14, P15, and of the median lines B1, B2. Note that the closed path CP0 is Q61→Q66→Q65→·→Kl→Ml→W2→Ml→Kl→Q64→Q63→Q62→Q61, and closed path CP1 is Q71→Q76→Q75→q11→m11→R14→R13→R12→R11→m21→q21→Q74→Q73→Q72→Q71. Further, CP2 is Q81→Q86→Q85→q12→m12→R24→R23→R22→R21→m22→q22→Q84→Q83→Q82→Q81. The closed path CP3 is similarly generated.

(29) When the closed paths LP1-LP5 and CP0 CP3-CP3 have been obtained as set forth above, the processor 103

(a) moves the tool first to the centroid W1,
(b) then moves the tool along the closed paths LP1→LP2→LP3→LP4→LP5→CP0→CP1→CP-2→CP3, and
(c) finally moves the tool along the offset curve OFC, thereby completing the cutting of area AR.

Accordingly, by using the coordinate values of the starting point W1 of base line BSL stored in the RAM 111 through the above-described processing, the processor 103 obtains numerical data (incremental values between an initial position and the starting point W1) for making the tool approach the starting point W1 from the initial position, and thereafter executes ordinary path control using the incremental values.

When the approach is completed, the processor 103 moves the tool to the point Q11, then moves the tool along the first closed path LP1 in a cutting feed mode and thereafter moves the tool successively along LP2, LP3, . . . LP5, CP0, CP1, CP2, . . . CP3 in a similar manner to perform cutting.

Finally the tool is moved along the offset curve OFC in accordance with the data specifying the offset curve OFC stored in the RAM 111. This ends the area cutting processing. Thereafter, the next item of NC data is read from the NC tape and the foregoing processing is repeated.

Though a case has been described where the tool movement is LP1→LP2 . . . LP5→CP0→CP1→CP2→CP3 when performing cutting, it is permissible for the sequence to be reversed.

The present invention is not limited to the illustrated embodiment. It is possible to adopt an arrangement wherein an NC tape (NC data) containing tool path data for area cutting is prepared through the above-described method and the NC data are fed into an NC unit to cut the area.

According to the present invention, it is possible to minimize the occurrence of elongated, slender areas when dividing a region. As a result, wasted tool movement can be reduced to improve cutting efficiency.

We claim:

1. A area cutting method for cutting the interior of an area bounded by a closed curve, comprising the steps of:
    determining whether the area bounded by said closed curve is to be divided;
    obtaining, if division is necessary, a division value for all sets of apices, in which two apices form a set, by using an evaluation function indicative of a preset division value, and the division value produced based on said evaluation function increases with a decrease in distance between two apices Pi, Pj, increases with an increase in angles at the apices Pi, Pj on the area side, and increases with a decrease in an angle defined by a bisector of each of said angles on the area side and a straight line PiPj;
    dividing the area by a straight line connecting two apices of a set having a maximum division value;
    repeating, for each divided area until there is no longer need for division, the obtaining and dividing steps using said evaluation function when division is necessary; and
    determining tool paths on the basis of the divided areas and performing area cutting by moving a tool along said tool paths.

2. An area cutting method for cutting the interior of an area bounded by a closed curve, comprising the steps of:
    determining whether the area bounded by said closed curve is to be divided;
    obtaining, if division is necessary, a division value for all sets of apices, in which two apices form a set, by using an evaluation function indicative of a preset division value;
    dividing the area by a straight line connecting two apices of a set having a maximum division value;
    repeating, for each divided area until there is no longer need for division, the obtaining and dividing steps using said evaluation function when division is necessary; and
    determining tool paths on the basis of the divided areas and performing area cutting by moving a tool along said tool paths said determining tool paths step comprising the steps of:
    obtaining a number of partitions for each divided area in such a manner that a cut-in amount is maximized without exceeding an allowable value, and partitioning line segments connecting the centroid and apices of each divided area at the number of partitions conforming to said divided area, and
    generating tool paths successively connecting corresponding partitioning points in each divided area.

3. An area cutting method for cutting the interior of an area bounded by a closed curve, comprising the steps of:
    determining whether the area bounded by said closed curve is to be divided, said determining whether step comprising the steps of:
        obtaining the centroid of the area;
        checking whether said centroid lies inside the area;
        checking whether a line segment connecting the centroid and a respective apex intersects the closed curve if the centroid lies inside the area; and
        deciding that division of the area is necessary when the centroid lies outside the area or a line segment connecting the centroid and an apex of the area intersects the closed curve in a case where the centroid lies inside the area;
    obtaining, if division is necessary, a division value for all sets of apices, in which two apices form a set, by using an evaluation function indicative of a preset division value;
    dividing the area by a straight line connecting two apices of a set having a maximum division value;
    repeating, for each divided area until there is no longer need for division, the obtaining and dividing steps using said evaluation function when division is necessary; and
    determining tool paths on the basis of the divided areas and performing area cutting by moving a tool along said tool paths.

* * * * *

UNITED STATES PATENT AND TRADEMARK OFFICE
CERTIFICATE OF CORRECTION

PATENT NO. : 4,823,275

DATED : April 18, 1989

INVENTOR(S) : Kunio Tanaka et al.

It is certified that error appears in the above-identified patent and that said Letters Patent is hereby corrected as shown below:

FRONT PAGE, [73], "Fanuc," should be --Fanuc Ltd,--.

Col. 2, line 14, after "machine" insert --the--;

line 15, "For" should be --(For--.

Col. 7, line 56, "the each" should be --each--.

Col. 9, line 27, "degined" should be --difined--.

Col. 11, line 12, "CP3-CP3" should be -- -CP3 --.

line 56, "A" should be --An--.

Signed and Sealed this

Twelfth Day of December, 1989

Attest:

JEFFREY M. SAMUELS

Attesting Officer     Acting Commissioner of Patents and Trademarks